United States Patent

[11] 3,568,882

[72] Inventors Samuel S. Aidlin
214 Beaumont St., New York;
Stephen H. Aidlin, 3855 Shore Parkway,
Brooklyn, N.Y. 11235
[21] Appl. No. 816,216
[22] Filed Apr. 15, 1969
[45] Patented Mar. 9, 1971

[54] HOPPER-TYPE APPARATUS FOR FEEDING ORIENTED SHALLOW FLANGED ARTICLES
5 Claims, 6 Drawing Figs.
[52] U.S. Cl. ................................................ 221/164,
221/167, 198/30
[51] Int. Cl. ................................................ B23q 7/12
[50] Field of Search ........................................ 221/164,
167, 168, 182; 222/186; 198/30

[56] References Cited
UNITED STATES PATENTS
| | | | |
|---|---|---|---|
| 2,853,176 | 9/1958 | Kay et al. | 221/167X |
| 2,924,355 | 2/1960 | Birkett | 221/167 |
| 3,168,949 | 2/1965 | Aidlin | 198/30 |

Primary Examiner—David M. Bockenek
Attorney—Victor M. Helfand

ABSTRACT: Hopper-type apparatus for feeding oriented shallow, flanged articles, such as jar caps, which includes a hopper having a rotating hopper bottom provided with a circular row of pins set into its surface in spaced relation to the wall of the hopper, and a ramp mounted in the lower part of the hopper, with its slope facing the direction of rotation of the bottom, and its lower end contacting the same, to thereby raise articles from the hopper bottom moved by the rotation thereof and drop them over the pins passing the ramp.

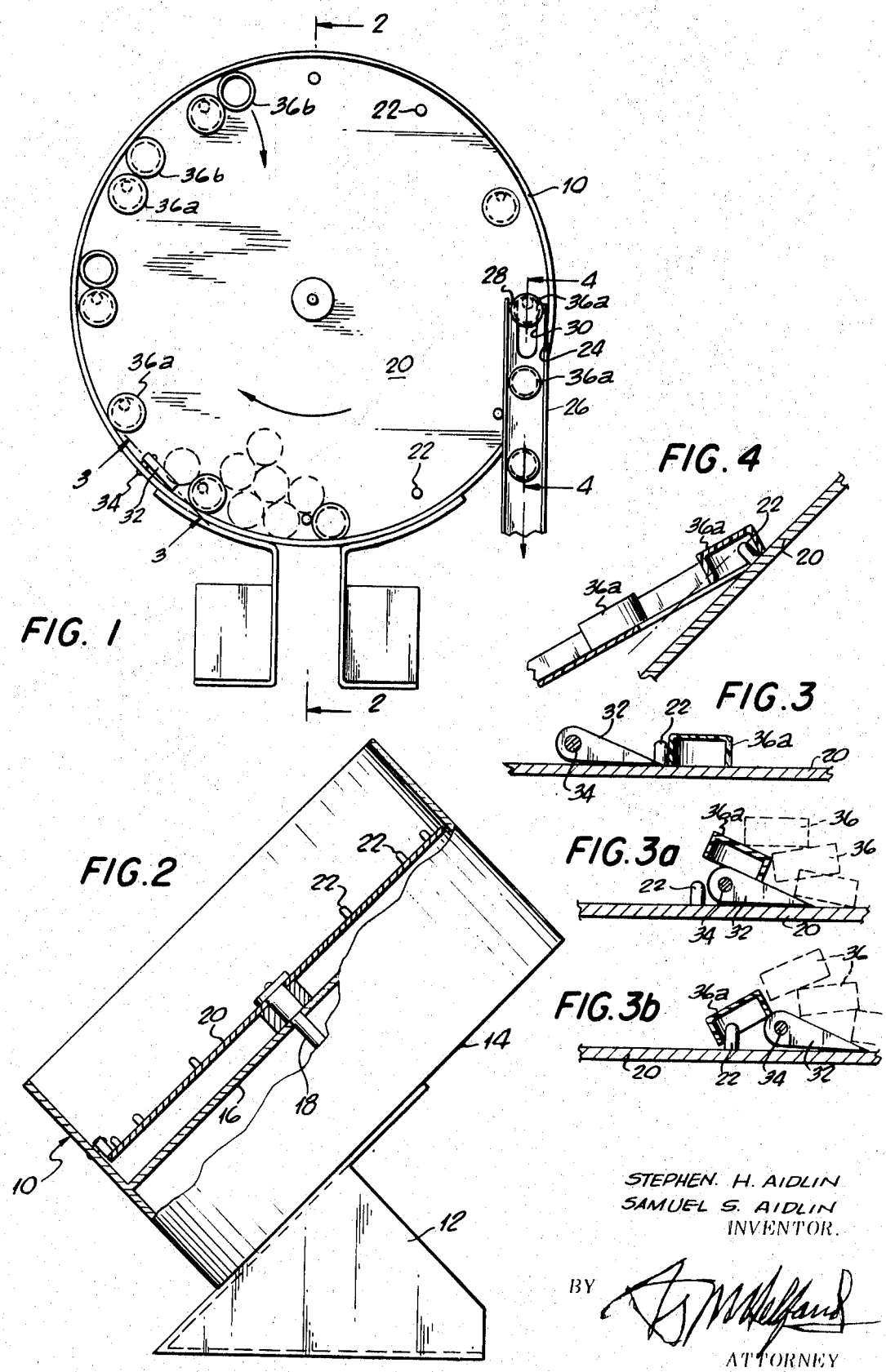

HOPPER-TYPE APPARATUS FOR FEEDING ORIENTED SHALLOW FLANGED ARTICLES

The present invention relates to automatic apparatus for orienting and feeding relatively flat, flanged articles, and is an extension of the invention described and claimed in U.S. Pat. No. 3,168,949 dated Feb. 9, 1965.

In said patent there is described and claimed hopper feed apparatus for automatically feeding flat, circular articles, with or without central openings, by means of a rotating platform within a hopper, formed with a peripheral groove within which the articles fit and within which are set spaced pins that either engage the edges of the articles picked up within the groove and push them in the groove into a chute leading out of the hopper, or over which the articles may be engaged by the center opening and carried along, as the disc rotates, to the discharge chute.

The present invention is directed to automatic hopper-type apparatus for feeding shallow, flanged articles, such as closure caps for jars, cans, or the like, oriented with their cavities facing downwardly, in capping position.

It has hitherto not been practical or feasible to automatically feed such shallow, flanged, circular articles, such as closure caps oriented with their cavities facing downwardly, from a hopper-type apparatus, such as described in the said patent, by means of pins set along the periphery of the rotating bottom disc within the hopper. Such pins, if serving as pusher pins, would not be able to distinguish between articles oriented with their flanges facing upwardly or downwardly, so as to deliver them in proper, oriented position. Further, if the pins should engage against the edge of a closure cap disposed with flange down, and push such cap, it would drop back into the hopper when it reaches the top thereof by gravity. The only caps that could be fed in oriented position by the apparatus of the said patent would, therefore, be only such caps that are disposed flange down, which might be haphazardly engaged by pins extending into the hollow of the cap. It will be clear, therefore, that only very few of the flanged caps that are disposed flange down in the hopper would be caught on a pin extending into the cap interior and that such hopper feed apparatus would deliver oriented caps, at a very low rate of speed; completely impractical for commercial production purposes.

It is an object of the present invention to provide hopper feed apparatus that will feed articles, of the character described, at a very much greater rate of speed, sufficient for efficient commercial production, by ensuring that a greater number of articles disposed within the hopper with their flanges down are engaged over the pins set into a rotating disc for movement by the pins out of the hopper.

It is another object of the present invention to provide apparatus for automatically feeding articles, of the character described, in oriented position, which is of relatively simple and sturdy construction, which is compact, which is simple and easy to operate, and which will require a minimum of attention and maintenance.

The foregoing and other objects and advantages of the automatic hopper feed apparatus of the present invention will become more readily apparent to those skilled in the art from the embodiments thereof shown in the accompanying drawing, and from the description following. It is to be understood, however, that such embodiments are shown by way of illustration only, to make the principles and practice of the invention more readily comprehensible and without any intent of limiting the invention to the specific details therein shown.

In the drawings:

FIG. 1 is a more or less diagrammatic, top plan view of one embodiment of hopper feed apparatus formed according to the present invention;

FIG. 2 is a partly sectional elevation of the apparatus of FIG. 1, the section being taken along line 2–2 of FIG. 1.

FIG. 3 is a section taken on line 3–3 of FIG. 1;

FIG. 3a is a view similar to that of FIG. 3, showing a properly oriented article in one position of movement on the ramp; and FIG. 3b is a view similar to that of FIG. 3a with the article in a further advanced position.

Referring now in greater detail to the embodiment of the invention illustrated in the drawings, the apparatus comprises a hopper formed of a hollow cylinder, 10, supported in fixed position, as by the base or stand, 12, which may rest on a supporting surface, with the longitudinal axis of the cylinder at an angle of about 45° to the horizontal. The cylinder 10 may be of greater length than required for the purposes of a hopper for the apparatus and may be provided with a bottom wall, 14, at right angles to its longitudinal axis by which it may be secured to the stand 12.

The cylinder 10 has secured therein at an intermediate point of its height a partition, 16, which is parallel to its bottom wall 14 and divides the cylinder 10 into an inner compartment within which may be disposed a motor (not shown), and an outer compartment. The motor within the inner compartment has its shaft, 18, extend through partition 16 into the outer cylinder compartment and mounts at its end a rotary disc, 20, which forms the bottom of the hopper portion of the cylinder 10. Set into the disc 20 are a plurality of spaced pins, 22, arranged in a circular row adjacent the periphery of the disc and at a distance from the cylinder wall that is less than the diameter or width of an article to be fed.

Formed in the wall of the cylinder 10, adjacent a side of the apparatus and below its horizontal diameter, is an inwardly-downwardly-extending recess, 24, through which there extends into the cylinder, from the exterior thereof, a troughlike outlet chute, 26, whose inner end, 28, substantially contacts the disc 20 at approximately the horizontal diameter of the hopper and slopes outwardly from the hopper at an angle less than 45° to the horizontal. The end 28 of the chute 26 is disposed in the path of rotation of pins 22 and is, therefore, formed with an escapement slot, 30, extending thereinto from its inner edge, through which the pins 22 may clear the chute 26.

Also provided on the interior of the hopper, preferably in the space between the cylinder wall 10 and the row of pins 22, is a preferably wedge-shaped ramp, 32, which is preferably pivoted at its higher or thicker end on a pin, 34, set into the cylinder 10, at a point substantially midway between its vertical and horizontal axes, with the slope of the ramp 32 facing the direction of rotation of the hopper bottom disc 20, and its lower end contacting the same. In the illustrated embodiment of the invention, the disc 20 is illustrated as rotating in clockwise direction, and the ramp 32 is shown as being pivoted in the lower half of the hopper, on the up side thereof, to the left of its vertical axis.

In operation, a plurality of flanged articles, such as 36, are disposed in a haphazard pile at the bottom of the hopper. Some of these articles will be disposed with their flange downwardly directed, as indicated at 36a, and others will be disposed with their flange upwardly directed, as indicated at 36b.

As the disc 20 is rotated in a clockwise direction, articles 36 from the bottom of the pile will be moved, primarily by friction against the disc, due to the weight and pressure of articles on top or to the rear or right of the pile, in the direction of the ramp 32 and over such ramp. Articles such as 36b with their flange upwardly extending will be dropped off the ramp 32 with their flat side contacting the disc 20 and carried thereby a distance upwardly, to be dropped back to the bottom of the hopper by gravity. However, articles 26a having their flange downwardly facing, which are the bottom of the pile and adjacent the cylinder wall, will be moved up the ramp 32 and dropped over its edge over a pin 22 moving alongside of the ramp, to be engaged by such pin and moved thereby along the upward side of the hopper and then on the down side of the hopper until it is engaged over the inner edge 28 of the chute 26 and swept therealong out of the hopper to a point of destination, properly oriented, with flange down.

It will be apparent that, by means of the ramp, substantially all, if not all, articles 26a at the bottom of a pile and closely adjacent to the periphery of the disc 20 will be directed by ramp 32 into engagement with a pin 22 for orienting and feeding into chute 26 and out of the hopper, thereby greatly increasing the rate of feeding of properly oriented articles.

It may here be stated that while the ramp 32 is shown as hinged upon the wall of the cylinder, which is stationary, such ramp may be otherwise mounted, as from a structure overhanging the hopper disc 20; and also that it may be made to straddle the row of pins 22 rather than lie between it and the wall of the cylinder, by providing an escapement slot therewithin in the same manner as escapement slot 30 provided in the chute 26.

This completes the description of the apparatus of the present invention. It will be readily apparent that it can feed properly oriented articles, of the character described, at a high and commercially practicable rate of speed; that it is of simple construction and highly effective for its purposes; that it is compact and sturdy and will require a minimum of care and attention.

It will be further apparent that numerous variations and modification may be made in the feeding and orienting apparatus of the present invention by anyone skilled in the art, in accordance with the principles of the invention hereinabove set forth, without the exercise of any inventive ingenuity.

We claim:

1. Apparatus for the oriented feeding of articles, of the character described, comprising a hopper formed of a hollow cylinder, means supporting said cylinder with its longitudinal axis at an angle to the horizontal, a disc rotatably supported within said cylinder inwardly of its upper edge, means rotating said disc, said disc having a circular row of spaced pins set into the outer surface thereof in spaced relation to the cylinder wall, an outlet chute in the path of rotation of said pins having its inner edge substantially in contact with the surface of said disc at approximately its horizontal axis, and stationary means in the path of rotation of said disc for slidably elevating articles at the bottom of the hopper moved by said rotating disc for dropping over a pin passing said elevating means.

2. The apparatus of claim 1, wherein said elevating means comprises a ramp fixedly supported in the lower portion of said hopper intermediate the wall of said cylinder and said row of pins, said ramp having its slope facing the direction of rotation of said disc with its lower end contacting the surface thereof.

3. The apparatus of claim 1, wherein said elevating means is disposed at substantially the midpoint between the horizontal and vertical axes of said disc.

4. The apparatus of clam 2, wherein said ramp is disposed at substantially the midpoint between the horizontal and vertical axes of said disc.

5. The apparatus of claim 2, wherein said ramp is pivotally supported by its higher end on the wall of said cylinder.